Jan. 27, 1942.  J. H. EAGLE  2,271,222
DIAPHRAGM BLADE
Filed April 2, 1941
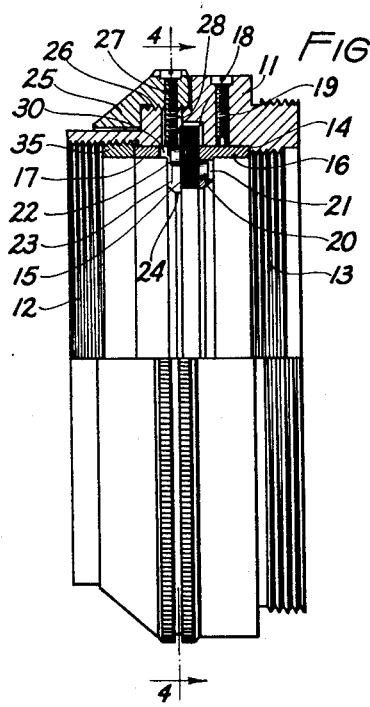
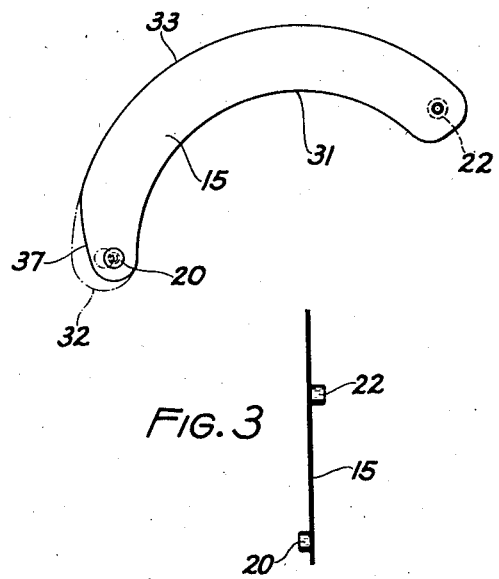
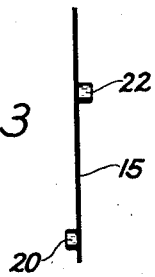
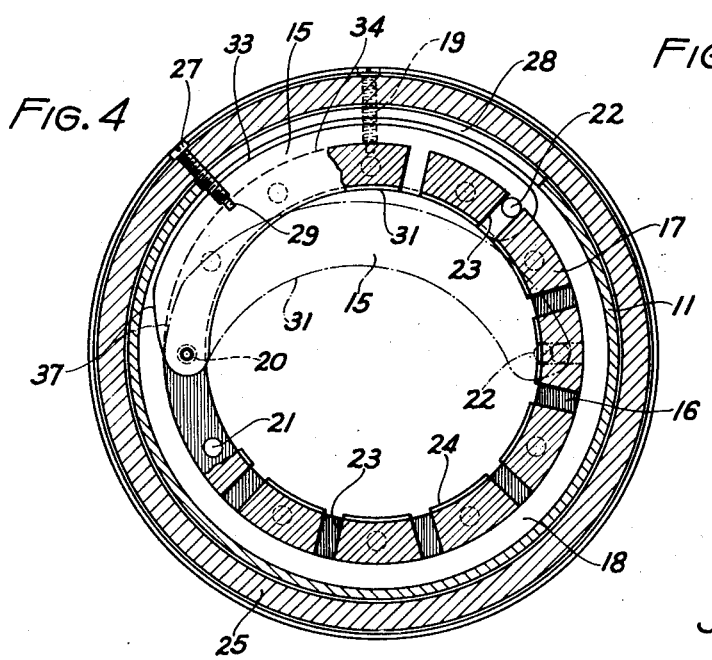
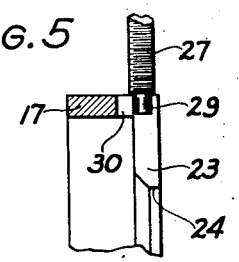
JOHN H. EAGLE
INVENTOR
BY
ATTORNEYS Patented Jan. 27, 1942

2,271,222

UNITED STATES PATENT OFFICE 2,271,222

DIAPHRAGM BLADE

John H. Eagle, Rochester, N. Y., assignor to Eastman Kodak Company, Rochester, N. Y., a corporation of New Jersey Application April 2, 1941, Serial No. 386,495

5 Claims. (Cl. 95—64)

The present invention relates to photography, and more particularly to a new and improved form of diaphragm blade for use in a diaphragm of the iris type.

In the conventional type of iris diaphragm unit, the diaphragm wings or blades are laid in place between a diaphragm plate and a diaphragm retainer. This unit is then held in a suitable fixture and assembled or placed in position in the lens barrel. One end of each diaphragm blade or wing is fixedly pivoted on the diaphragm plate, while the other end moves in a radial slot formed in the diaphragm retainer. The blade pivot is positioned approximately midway between the outer and inner edges of the blade so that the blade assembly will occupy approximately the same diameter in any degree of aperture opening. Because of this, the inside diameter of the lens barrel opening into which the diaphragm unit is assembled must, in the conventional design, be at least as large as the outside diameter of the diaphragm unit.

In general, it could be said that it is almost always desirable to design a lens mount as compact as possible. This is especially true with cameras using interchangeable lenses where several lenses must fit the same mounting flange. Shutter assemblies, as is well known, comprise the shutter blades, the operating mechanism therefor, and the housing, and are formed with threaded openings adapted to receive front and rear lens mounts which may be readily and easily removed and replaced by other suitable mounts adapted for the particular purpose at hand. These lens-mount receiving openings in the shutter assemblies are smaller in diameter than the openings in lens barrels of the conventional type of diaphragm assembly. However, it is often desirable, for certain purposes, to change the lens mounts from the shutter assembly to the diaphragm assembly. It will be readily apparent, therefore, that in order to make such an interchange of lenses possible, the diaphragm and shutter assemblies must have the same mounting specifications. In other words, the diameters of the lens mount openings and the mounting threads must be the same. To secure this result, the lens barrel of the conventional diaphragm assembly could be made in two pieces which may be assembled after the diaphragm unit has been mounted in position therein. This two-piece barrel would, however, be more complicated and costly to assemble, and the two mounting threads might not be perfectly concentric, the disadvantages of which will be readily apparent to those in the art.

In order to overcome these difficulties, the present invention provides a new and novel form of diaphragm blade construction which permits the positioning of a diaphragm unit in a one-piece lens barrel formed with a front lens-mount opening of the same mounting specifications as that of the shutter assembly. By means of this arrangement, the lens mounts may be readily and easily interchanged between the shutter and the diaphragm assemblies.

The present invention, therefore, has as its principal object, the provision of a diaphragm blade construction which will permit the assembly of the diaphragm unit in a one-piece lens barrel formed with a front opening having a diameter smaller than that required by the conventional form of diaphragm blades.

Another object of the invention is the provision of a diaphragm unit which is so designed that it may be assembled in a lens barrel opening of a diameter smaller than the diameter of the outer edges or surfaces of the diaphragm blades in the maximum aperture position.

A further object of the invention is the provision of a diaphragm blade construction which will permit the diaphragm assembly to pass through an opening in a one-piece lens barrel of the same mounting specifications as the lens-mount opening in a shutter assembly.

A still further object of the invention is the provision of a diaphragm blade which is so constructed that when the blades are moved to a partially closed position, the blades will be within a circle of less diameter than that occupied by the outer surfaces of the blades in the maximum aperture position.

To these and other ends, the invention resides in certain improvements and combinations of parts, all as will be hereinafter more fully described, the novel features being pointed out in the claims at the end of the specification.

In the drawing:

Fig. 1 is a side view of a diaphragm assembly, with parts in section and parts in elevation, showing the relation thereto of the diaphragm blade unit constructed in accordance with the present invention;

Fig. 2 is a plan view of one of the diaphragm blades constructed in accordance with the preferred embodiment of the present invention;

Fig. 3 is a side elevation of blade illustrated in Fig. 2;

Fig. 4 is a transverse vertical sectional view through the diaphragm assembly illustrated in Fig. 1, and taken substantially on line 4—4 thereof, showing the relation thereto of the diaphragm blade arrangement constructed in accordance with the present invention; and Fig. 5 is a vertical sectional view through a portion of the diaphragm retainer plate, showing the arrangement for actuating the diaphragm retainer to vary the diaphragm opening.

Similar reference numerals throughout the various views indicate the same parts.

The present invention is embodied, in the present instance, in a lens diaphragm assembly which comprises, broadly, a tubular lens barrel 11, formed with a front threaded opening 12 adapted to receive a front lens mount, and a rear threaded opening 13 adapted to receive a rear lens mount. The diaphragm blades, broadly designated by the numeral 15, are positioned between an annular diaphragm plate 16 and an annular diaphragm retainer plate 17, and cooperate therewith to form a diaphragm unit. This diaphragm unit, when in position in the lens barrel 11, engages a shoulder 14 and is positioned in an annular recess 18, and is retained therein by screws 19 which extend through the lens barrel 11 and engage the diaphragm retainer 17, as shown in Fig. 1, and well known by those in the art. A threaded retainer ring 35 is screwed into the front opening 12 to securely hold the diaphragm unit in place in the recess 18 and against the shoulder 14, and clearly shown in Fig. 1.

One end of each blade 15 is formed with a pin 20 which is positioned in an aperture 21 formed in the diaphragm plate 16 to pivotally mount the blade 15 thereon, while the other end of the blade is formed with an oppositely projecting pin 22 which is positioned in a radial slot 23 extending inwardly from the inner edge 24 of the retainer plate 17. An annular diaphragm operating ring 25 is threadably mounted on the outer surface 26 of the lens barrel 11, and is operatively connected to the retainer plate 17 by a screw 27 which extends through the ring 25 and a registering limiting slot 28 in the barrel 11, and which has the end 29 terminating in an axially extending slot 30 in the retainer plate 17. By means of this arrangement, the rotation of the ring 25 serves to rotate the retainer 17 as a unit therewith relative to the plate 16 to pivot the blades 15 to vary the position of the inner aperture forming edges 31 of the blades 15 to adjust the diaphragm openings. During this adjustment, the pins 22 move along the radial slots 23 of the retainer plate 17, all of which is well known.

The conventional type of diaphragm blade is of the general shape shown in Fig. 2, and has the end 32 adjacent the pivoted pin 20 rounded, as shown in dotted lines, Fig. 2. This rounded end is substantially concentric with the pin 20 so that the pivot point of each blade is approximately midway between the inner curved aperture forming edge 31 and the curved outer edge 33, concentric with the inner edge 31. When the blades are moved to maximum aperture forming position, the inner edges 31 and the outer edges 33 are substantially concentric with the axis of the lens barrel, and the outer edges 33 lie in the annular recess 18, as shown in full lines in Fig. 4. It will now be readily apparent, to those in the art, that with the conventional rounded end 32, concentric with the pivot 20, a portion of this end will always lie outside of the circle 34, Fig. 4, in all positions of adjustment of the diaphragm blades. This circle 34 is equal to the outer diameter of the plate 16 and the retainer 17, as clearly shown in Fig. 4. In order to thus assemble this conventional type of blade with its plate 16 and retainer 17 in a one-piece lens barrel, the latter must, of necessity, be provided with a front opening at least as large as the diameter of the outer edges 33 of the blades 15 in the maximum aperture forming position, as shown in full line in Fig. 4. As such an opening is larger than the circle 34 and also the opening of the shutter assembly, it is not adapted to receive the interchangeable lens mount. However, the front opening of the lens barrel 11 may be made to the same size and thread specification as the opening in the shutter assembly, but with such a smaller opening, the lens mount of the conventional type must, of necessity, be made in two pieces to permit assembly of the conventional diaphragm unit therein. The disadvantages of such a two-piece lens barrel have been pointed out above.

In order to overcome these difficulties, and to secure the advantages of a one-piece lens barrel, the present invention provides a diaphragm blade construction which may be assembled through a lens barrel opening having a diameter which is smaller than that of the diameter of the outer edges 33 of the blades 15 in the maximum aperture position. In other words, the diaphragm unit of the present invention may be assembled through a front opening 12 which is the same size as the circle 34, and which is equal in diameter to and formed with the same mounting threads as the opening in the shutter assembly. By means of this arrangement, the one-piece lens barrel 11 may receive the various lens mounts designed for use with the shutter assembly, the advantages of which will be obvious.

To secure this result, each blade 15 has a portion 37 of the outer edge 33, adjacent the pivot pin 20, tapered or cut away on a radius of curvature different from that of the radius of curvature of the main portion of the edge 33. This cutaway or tapered portion 37 is non-concentric with the pivot 20, as clearly shown in Fig. 2. Fig. 4 shows, in full lines, the arrangement of the portion 37 when the blades 15 are at the maximum aperture forming position. When however the blades 15 are moved to a partially closed position, as shown in broken line Fig. 4, due to the non-concentric relation of the portion 37, the latter, and the edge 33, will lie completely within the circle 34 which is equal in diameter to the opening 12. Thus by means of this cut-away or tapered end 37 the entire outer surface of each blade 15 may be made to occupy a diameter less than that of the circle 34, as clearly illustrated in broken lines in Fig. 4. With this type of blade construction, the blade may be moved to a partially closed position and assembled through the front opening 12 in a one-piece lens barrel 11, thus securing the advantages of the smaller opening 12, and also overcoming the undesirable disadvantages of a two-piece lens barrel construction.

It is thus apparent that the blade construction of the present invention permits the assembly of the diaphragm unit through a lens barrel opening having a diameter which is less than that of the outer edges of the diaphragm blades in the maximum aperture position. Furthermore, this lens barrel opening may thus be made of the same diameter and the same mounting thread as that of the shutter assembly so that various lens mounts may be readily and easily interchanged between the diaphragm and shutter assemblies.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the appended claims.

I claim:

1. A lens diaphragm comprising a lens barrel formed with an axially extending opening, an annular diaphragm supporting member positioned in said opening, a diaphragm having a plurality of aperture forming blades adjustably mounted on said member and movable relative thereto to vary the size of the diaphragm aperture, means for moving said blades, each of said blades being formed with an inner aperture forming edge and an outer curved edge, said blades being of such size that said outer edges will lie on a circle of a diameter greater than said opening when said blades are in maximum aperture position, and a tapered end portion formed on said outer edge of each of said blades and so positioned thereon that when the blades are moved to a partially closed position the entire portion of said outer edges will then lie within a circle of a diameter less than said opening to permit the insertion therein of said blades and support in assembled relation.

2. A lens diaphragm comprising a lens barrel formed with an axially extending opening, an annular diaphragm supporting member positioned in said opening, a diaphragm having a plurality of aperture forming blades adjustably mounted on said member and movable relative thereto to vary the size of the diaphragm aperture, means for moving said blades, each of said blades being formed with an inner aperture forming edge and an outer edge having one radius of curvature for the greater portion of its length, said greater portion being positioned to lie on a circle of a diameter greater than said opening when said blades are in maximum aperture forming position, and an end portion formed on said outer edge of each blade and having a different radius of curvature than said greater portion so that when said blades are moved to a partially closed position both of said portions will lie completely within a circle of a diameter less than said opening so that said blades and supporting member may be passed through said opening in the completely assembled relation.

3. A lens diaphragm comprising a lens barrel formed with an axially extending opening, an annular diaphragm supporting member positioned in said opening, a diaphragm having a plurality of aperture forming blades each of which is pivotally mounted at one end on said member and movable relative thereto to adjust the size of the diaphragm aperture, means for moving said blades about their pivots, each of said blades being formed with an inner aperture forming edge and an outer curved edge, the latter being positioned relative to said inner edge so as to lie along a circle of a diameter greater than said opening when said inner edges are in maximum aperture position, and a cut-away portion formed on the outer edge of each blade adjacent the pivot thereof so that when said blades are moved to a partially closed position said outer edges will then lie completely within a circle of a diameter less than said opening to permit the insertion therethrough of said blades and said support in completely assembled relation.

4. A lens diaphragm comprising a lens barrel formed with an axially extending opening, an annular diaphragm supporting member positioned in said opening, a diaphragm having a plurality of aperture forming blades each of which is pivotally mounted at one end on said member and movable relative thereto to adjust the size of the diaphragm aperture, means for moving said blades about their pivots, each of said blades being formed with an inner aperture forming edge and an outer edge having one radius of curvature over the greater portion of its length, said outer edges being so arranged as to lie along a circle of a greater diameter than said opening when said inner edges are adjusted to maximum aperture position, and a short curved portion of different radius formed on each outer edge adjacent and non-concentric with the pivot of each blade so that when the blades are adjusted to a partially closed position said curved portions will lie completely within a circle of less diameter than said opening to permit the insertion therein of said blades and support in assembled relation.

5. A lens diaphragm comprising a lens barrel formed with an axially extending opening, an annular diaphragm supporting member positioned in said opening, a diaphragm having a plurality of aperture forming blades each of which is pivotally mounted at one end on said member and movable relative thereto to adjust the size of the diaphragm aperture, means for moving said blades about their pivots, each of said blades being formed with a curved inner aperture forming edge and a curved outer edge having the greater portion of its length concentric with said inner edge, said greater portion of said blades being adapted to lie along a circle of a diameter greater than said opening when said inner edges are adjusted to maximum aperture position, and a short curved end portion formed on the outer edge of each blade adjacent the pivot thereof and non-concentric thereto so that when said blades are moved to a partially closed position said portions will lie completely within a circle of a diameter less than said opening so that said member and blades may be inserted therein in a fully assembled relation.

JOHN H. EAGLE.